(12) United States Patent
Zhao

(10) Patent No.: US 12,523,881 B2
(45) Date of Patent: Jan. 13, 2026

(54) 3D DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Jinyang Zhao, Shenzhen (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 768 days.

(21) Appl. No.: 17/607,340

(22) PCT Filed: Sep. 14, 2021

(86) PCT No.: PCT/CN2021/118118
§ 371 (c)(1),
(2) Date: Oct. 28, 2021

(87) PCT Pub. No.: WO2023/029082
PCT Pub. Date: Mar. 9, 2023

(65) Prior Publication Data
US 2024/0045226 A1    Feb. 8, 2024

(30) Foreign Application Priority Data

Sep. 6, 2021 (CN) .......................... 202111037312.6

(51) Int. Cl.
*G02B 30/52* (2020.01)
(52) U.S. Cl.
CPC .................................. *G02B 30/52* (2020.01)

(58) Field of Classification Search
CPC ................................ G02B 30/52; G02B 30/50
See application file for complete search history.

(56) References Cited

U.S. PATENT DOCUMENTS

| 4,525,711 A | 6/1985 | Gery |
| 7,215,837 B2 * | 5/2007 | Trutna, Jr. ............... G02F 1/125 |
| | | 385/901 |

(Continued)

FOREIGN PATENT DOCUMENTS

| CN | 101064081 A | * 10/2007 | ......... G02B 27/2278 |
| CN | 101241657 A | 8/2008 | |

(Continued)

OTHER PUBLICATIONS

Chinese Office Action issued in corresponding Chinese Patent Application No. 202111037312.6 dated Mar. 30, 2022, pp. 1-7.

(Continued)

*Primary Examiner* — Sharrief I Broome
*Assistant Examiner* — K Muhammad
(74) *Attorney, Agent, or Firm* — PV IP PC; Peter S. Stecher; Wei Te Chung

(57) ABSTRACT

The present application provides a 3D display device. The 3D display device comprises a plurality of light-emitting fibers and a plurality of electrode wires. A plurality of light-emitting fibers are arranged at intervals and arranged in different planes. A plurality of electrode wires are arranged at intervals and arranged across and in contact with the corresponding light-emitting fibers to form a 3D network structure.

17 Claims, 4 Drawing Sheets

(56) References Cited

U.S. PATENT DOCUMENTS

| | | | |
|---|---|---|---|
| 9,046,926 B2* | 6/2015 | Mohammed | G06F 3/016 |
| 9,423,682 B2* | 8/2016 | Refai | G02B 30/50 |
| 2002/0046020 A1* | 4/2002 | Ishibashi | G06F 3/011 |
| | | | 704/201 |
| 2003/0090200 A1 | 5/2003 | Topelberg | |
| 2006/0273983 A1* | 12/2006 | Koo | G02B 30/52 |
| | | | 345/6 |
| 2020/0098997 A1* | 3/2020 | Watabe | H10K 85/654 |

FOREIGN PATENT DOCUMENTS

| | | |
|---|---|---|
| CN | 207115895 U | 3/2018 |
| CN | 207503547 U | 6/2018 |
| CN | 109559648 A | 4/2019 |
| CN | 110568658 A | 12/2019 |
| CN | 111866494 A | 10/2020 |
| JP | 2005005120 A | 1/2005 |
| KR | 20090103844 A * | 10/2009 |

OTHER PUBLICATIONS

International Search Report in International application No. PCT/CN2021/118118, mailed on May 26, 2022.

Written Opinion of the International Searching Authority in International application No. PCT/CN2021/118118, mailed on May 26, 2022.

* cited by examiner

3D DISPLAY DEVICE

RELATED APPLICATIONS

This application is a National Phase of PCT parent application NO. PCT/CN2021/118118 having international filing date Sep. 14, 2021, which claims the benefit of priority of Chinese Patent Application No. 202111037312.6 filed on Sep. 6, 2021. The contents of the above applications are all incorporated by reference as if fully set forth herein in their entirety.

BACKGROUND

Field of Invention

The present application relates to the display field, and particularly to a 3D display device.

Description of Prior Art

Holographic display is a real three-dimensional display realized by holographic principle. All the features of stereoscopic display can be seen through holographic display, and there is parallax effect. When observed at different positions, an object has significant displacement. Holographic display records the specific light wave emitted by an object in the form of interference fringes by interference principle, so that all the informations in front of the object light wave is stored in a recording medium. Therefore, the recorded interference fringe pattern is called "hologram". When the hologram is illuminated with light wave, the light wave of the original object can be reconstructed by diffraction principle, so as to form a three-dimensional image of the original object.

However, the principle of holographic display of stereoscopic images is complex, and it is difficult to be integrated into the display device. Therefore, there is an urgent need to provide a display device capable of realizing a stereoscopic image.

SUMMARY

The present application provides a 3D display device, which can display more comprehensive and real stereo images.

The present application provides a 3D display device comprising:
  a plurality of light-emitting fibers arranged at intervals and arranged in different planes; and
  a plurality of electrode wires arranged at intervals and arranged across and in contact with the corresponding light-emitting fibers to form a 3D network structure.

Alternatively, in some embodiments of the present application, along a first direction, the 3D display device comprises a plurality of display planes parallel to each other; and
  wherein in each display plane, a plurality of the light-emitting fibers are arranged along a second direction, a plurality of the electrode wires are arranged along a third direction, the second direction and the third direction intersect, and the second direction and the third direction are perpendicular to the first direction.

Alternatively, in some embodiments of the present application, the light-emitting fibers are arranged vertically across the electrode wire.

Alternatively, in some embodiments of the present application, the adjacent light-emitting fibers emit light with different colors.

Alternatively, in some embodiments of the present application, the light-emitting fibers comprise red light-emitting fibers, green light-emitting fibers, and blue light-emitting fibers; and
  wherein in the same display plane, the red light-emitting fibers, the green light-emitting fibers, and the blue light-emitting fibers are repeatedly arranged in any arrangement, and in the adjacent display planes, the light-emitting fibers are arranged correspondingly to each other.

Alternatively, in some embodiments of the present application, the light-emitting fibers comprise white light-emitting fibers, red light-emitting fibers, green light-emitting fibers, and blue light-emitting fibers; and
  wherein in the same display plane, the white light-emitting fibers, the red light-emitting fibers, the green light-emitting fibers, and the blue light-emitting fibers are repeatedly arranged in any arrangement, and in the adjacent display planes, the light-emitting fibers are arranged correspondingly to each other.

Alternatively, in some embodiments of the present application, a resolution of the 3D display device is adjusted by an arrangement density of the light-emitting fibers and the electrode wires.

Alternatively, in some embodiments of the present application, a plurality of the electrode wires cover on the corresponding light-emitting fibers to provide contact and intersection with the light-emitting fibers.

Alternatively, in some embodiments of the present application, the 3D display device also comprises a first substrate and a second substrate arranged opposite to each other and a third substrate and a fourth substrate arranged opposite to each other, and the first substrate, the second substrate, the third substrate, and the fourth substrate are connected head to tail; and
  wherein one end of each of the light-emitting fibers is fixed on the first substrate, another end of each of the light-emitting fibers is fixed on the second substrate, one end of each of the electrode wires is fixed on the third substrate, and another end of each of the electrode wires is fixed on the fourth substrate.

Alternatively, in some embodiments of the present application, in a non-display state, the display device has a shape of a cube, a cuboid, or a sphere.

Alternatively, in some embodiments of the present application, a first via is arranged on the first substrate and/or the second substrate, a second via is arranged on the third substrate and/or the fourth substrate, and each of the light-emitting fibers extends outside the first substrate or the second substrate through the first via, and each of the electrode wires extends outside the third substrate or the fourth substrate through the second via.

Alternatively, in some embodiments of the present application, wherein an aperture of the first via is adapted to a radial size of a cross section of the light-emitting fiber, and an aperture of the second via is adapted to a radial size of a cross section of the electrode wire.

Alternatively, in some embodiments of the present application, the first substrate and/or the second substrate comprises first conductive pins, the third substrate and/or the fourth substrate comprises second conductive pins, one end of each of the light-emitting fibers is electrically connected with the corresponding first conductive pin, and one end of each of the electrode wires is electrically connected with the corresponding second conductive pin.

Alternatively, in some embodiments of the present application, the 3D display device further comprises a driving chip, the driving chip is connected with the light-emitting fibers through the first conductive pins, the driving chip is connected with the electrode wires through the second conductive pins, and the driving chip is configured to provide driving voltage to the light-emitting fibers and the electrode wires.

Alternatively, in some embodiments of the present application, the 3D display device further comprises a fifth substrate and a sixth substrate arranged opposite to each other, the first substrate, the second substrate, the third substrate, the fourth substrate, the fifth substrate, and the sixth substrate form a closed structure; and wherein the fifth substrate and the sixth substrate are made of transparent material.

Alternatively, in some embodiments of the present application, the light-emitting fiber comprises a conductive layer and an insulating dielectric layer coaxially arranged from inside to outside, and a light-emitting material is arranged in the insulating dielectric layer; and wherein the conductive layer and the electrode wires are made of transparent material and/or stretchable material.

Alternatively, in some embodiments of the present application, a thickness of the dielectric layer ranges from 5 μm to 500 μm.

Alternatively, in some embodiments of the present application, the light-emitting material comprises a plurality of light-emitting particles doped in the insulating dielectric layer.

Alternatively, in some embodiments of the present application, a particle size of the light-emitting material ranges from 50 nm to 10 μm; and wherein a doping concentration of the light-emitting material ranges from 1 mg/mL to 1000 mg/mL.

Alternatively, in some embodiments of the present application, the light-emitting material comprises a light-emitting layer, the insulating dielectric layer comprises a first insulating dielectric layer and a second insulating dielectric layer, the first insulating dielectric layer is coated outside the conductive layer, the light-emitting layer is coated outside the first insulating dielectric layer, and the second insulating dielectric layer is coated outside the light-emitting layer.

The present application provides a 3D display device. The 3D display device comprises a plurality of light-emitting fibers and a plurality of electrode wires. A plurality of light-emitting fibers are arranged at intervals and arranged in different planes. A plurality of electrode wires are arranged at intervals and arranged across and in contact with the corresponding light-emitting fibers to form a 3D network structure. The present application uses the light-emitting fibers and the electrode wires contact to form a three-dimensional network structure. Each intersection between the light-emitting fibers and the electrode wires is a pixel. By applying different driving voltages to the light-emitting fibers and the electrode wires, the corresponding pixel can emit light, so that the 3D display device can display a more comprehensive and real stereo image.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application. In addition, it should be understood that the specific embodiments described herein are only used to illustrate and explain the present application and are not used to limit the present application. In addition, the terms "first" and "second" are only used for descriptive purposes and can not be understood as indicating or implying relative importance or implicitly indicating the number of indicated technical features. Thus, the features defining "first" and "second" may explicitly or implicitly include one or more of the features.

The present application provides a 3D display device, which is described in detail below. It should be noted that the order of description of the following embodiments is not a limitation of the preferred order of the embodiments of the present application.

Figure 1:
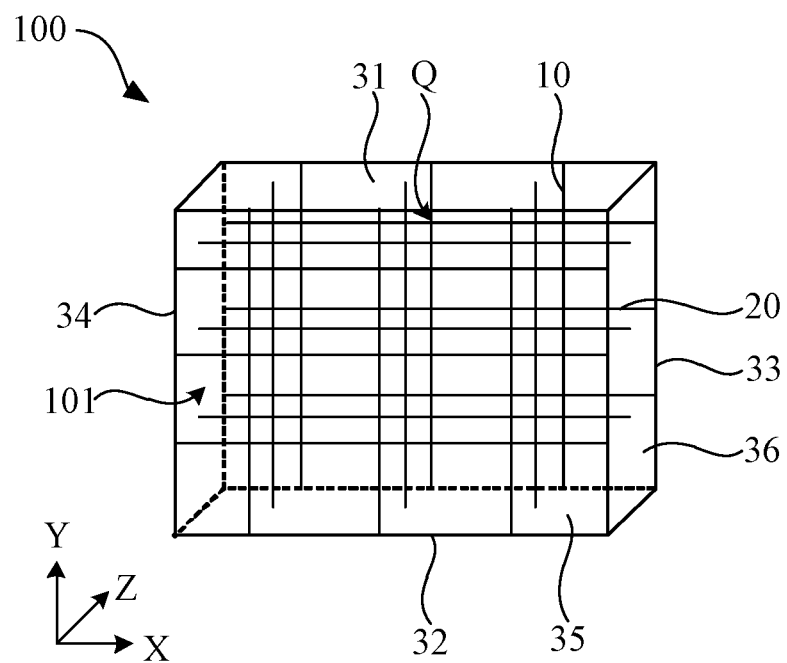
FIG. 1 is a first structural schematic diagram of a 3D display device provided by the present application.

Referring to FIG. 1, FIG. 1 is a first structural schematic diagram of a 3D display device provided by the present application. In the present application, the 3D display device 100 comprises a plurality of light-emitting fibers 10 and a plurality of electrode wires 20. A plurality of light-emitting fibers 10 are arranged at intervals and arranged in different planes. A plurality of electrode wires 20 are arranged at intervals and arranged across and in contact with the corresponding light-emitting fibers 10 to form a 3D network structure.

Thus, the present application uses the light-emitting fibers 10 and the electrode wires 20 contact to form a three-dimensional network structure. Each intersection Q between the light-emitting fibers 10 and the electrode wires 20 is a pixel. The light-emitting state of each intersection Q is controlled by the corresponding light-emitting fiber 10 and the electrode wire 20. Therefore, by applying different driving voltages to the light-emitting fibers 10 and the electrode wires 20, the corresponding pixel can emit light, so that the 3D display device 100 can display a more comprehensive and real stereo image.

Figure 2:
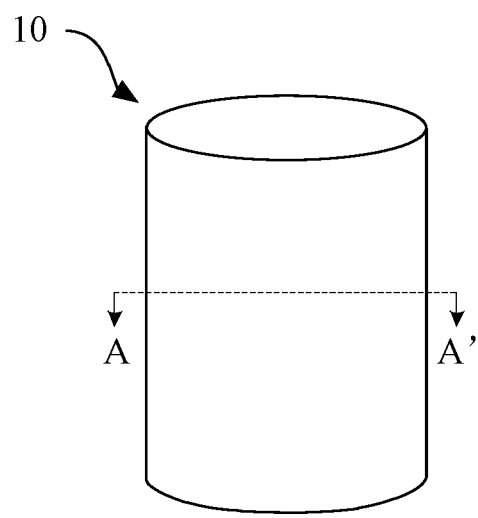
FIG. 2 is a structural schematic diagram of a light-emitting fiber provided by the present application.
Figure 3:
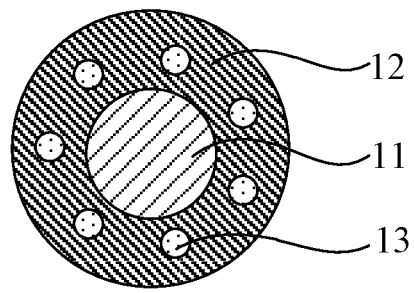
FIG. 3 is a schematic structural diagram of the first section along AA' of the light-emitting fiber shown in FIG. 2.

Referring to FIG. 2 and FIG. 3, FIG. 2 is a structural schematic diagram of a light-emitting fiber provided by the present application. FIG. 3 is a schematic structural diagram of the first section along AA' of the light-emitting fiber shown in FIG. 2. In the present application, the light-emitting fiber 10 comprises a conductive layer 11 and an insulating dielectric layer 12 coaxially arranged from inside to outside, and a light-emitting material 13 is arranged in the insulating dielectric layer 12.

In the present application, the materials of the conductive layer 11 and the electrode wires 20 may be metal conductive materials such as copper, aluminum and molybdenum. The materials of the conductive layer 11 and the electrode wires 20 can also be transparent conductive materials such as organic conducting polymers, indium gallium zinc, graphene, ionic conductive hydrogel, indium gallium zinc, indium gallium tin, antimony tin oxide, and so on. Among them, the organic conductive polymer can be poly (3,4-ethylenedioxythiophene) and so on. Ionic conductive hydrogel can be aluminum chloride polyacrylamide conductive hydrogel and so on. The aluminum chloride polyacrylamide conductive hydrogel exhibited stable tensile properties and sufficient ionic conductivity.

In the present application, the insulating dielectric layer 12 has insulating properties. When the light-emitting material 13 is dispersed light-emitting particles, the material of the insulating dielectric layer 12 needs to be able to disperse the light-emitting material particles. The material of the insulating dielectric layer 12 may be a transparent polymer material such as polydimethylsiloxane (PDMS), polyimide, polyethylene terephthalate (PET). A thickness of the insulating dielectric layer 12 ranges from 5 μm to 500 μm. For example, a thickness of the insulating dielectric layer 12 may be 5 μm, 50 μm, 100 μm, 250 μm, 400 μm, 500 μm, etc., which will not be repeated here.

Specifically, a size of the insulating dielectric layer 12 can be adjusted based on the particle size of the selected light-emitting material 13 and the displayed separation rate. It can be understood that the smaller the thickness of the insulating dielectric layer 12, the smaller the cross-sectional size of the light-emitting fiber 10. Then, a resolution of the 3D display device 100 can be made higher. In addition, a thickness of the insulating dielectric layer 12 is greater than a particle size of the light-emitting material 13 doped therein, so as to play the role of insulation protection.

In the present application, The light-emitting material 13 mainly comprises a base material and a light-emitting center. The base materials are usually II-VI compounds, ternary sulfides, oxides, fluorides, etc. The II-VI compounds can be ZnS, ZnSe, CAS, SrS, etc. The ternary sulfide can be $CaGaS_4$, $SrGa_2S_4$, etc. The oxides can be $Zn_2Si_{1-x}Ce_xO_4$, $ZnGa_2O_4$, $Ga_2O_3$, etc. The elements in the light-emitting center are usually transition metals, rare earth metals, etc. Transition metals can be manganese, copper, chromium, etc. Rare earth metals can be cerium, praseodymium, europium, terbium, etc. For example, the light-emitting material 13 may be ZnS:Mn, SrS:Ce, SrS:Cu, SrS:Ag/Cu, ZnS doped with rare earth elements, thioglycolate, other alkaline earth metal sulfides, etc.

Wherein, a particle size of the light-emitting material 13 ranges from 50 nm to 10 μm. For example, the particle size of the light-emitting material 13 may be 50 nm, 100 nm, 50 nm, 500 nm, 1 μm, 5 μm, 10 μm, etc., which will not be repeated here.

Wherein, Different kinds of light-emitting materials 13 emit light with different colors. For the same light-emitting material 13, different particle sizes may also emit light with different colors. In the present application, the same light-emitting material 13 or different kinds of light-emitting materials 13 can be arranged in the insulating dielectric layer 12.

It can be understood that the light-emitting material 13 emits light by electroluminescence. In some embodiments of the present application, the insulating dielectric layer 12 may also be doped with a photoluminescent material to realize the luminescence of the photoluminescent material by using the energy transfer process, so as to obtain richer luminescence colors. Among them, photoluminescent materials can be quantum dots, upconversion nanoparticles, phosphors, etc., which will not be described here one by one.

In some embodiments of the present application, the 3D display device 100 may be transparent to achieve a better display effect. In this regard, the light-emitting fibers 10 may be arranged as a transparent light-emitting fiber. That is, both the conductive layer 11 and the insulating dielectric layer 12 can be made of the above transparent materials. In addition, the electrode wires 20 can also be made of a transparent material, which can further improve the transparency of the 3D display device 100. Of course, the material of electrode wire 20 can also be opaque conductive metals such as copper, aluminum and molybdenum. When the electrode wires 20 are made of an opaque material, an opening rate (transparency) of the 3D display device 100 is determined by a density of the braid.

Further, the conductive layer 11, the insulating dielectric layer 12 and the electrode wire 20 are made of a stretchable material. For example, the materials of the conductive layer 11 and the electrode wires 20 are all stretchable conductive materials, such as ionic conductive hydrogels. And the material of the insulating dielectric layer 12 is a stretchable dielectric material, such as PDMS. Thus, a stretchable flexible 3D display device 100 is obtained. Then, the size of the 3D display device 100 can be changed by stretching the light-emitting fibers 10 and the electrode wires 20.

Figure 4:
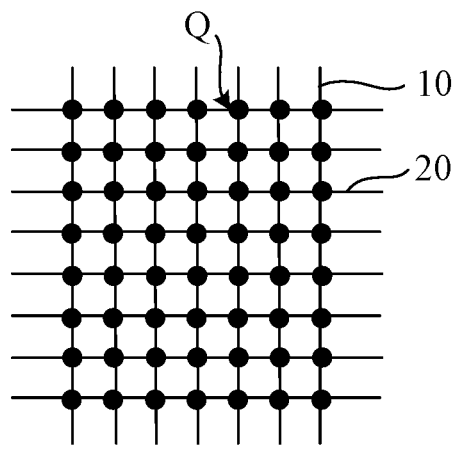
FIG. 4 is a light-emitting schematic diagram of light-emitting fibers and electrode wires provided by the present application.

Referring to FIG. 3 and FIG. 4, FIG. 4 is a light-emitting schematic diagram of light-emitting fibers and electrode wires provided by the present application. In the embodiment of the present application, the light-emitting fiber 10 only comprises a conductive layer 11 and an insulating dielectric layer 12. The light-emitting fiber 10 has the advantages of simple structure, higher production efficiency and lower production cost. However, based on the principle of electroluminescence, when the light-emitting fiber 10 shown in FIG. 3 is used, it is necessary to additionally arrange the electrode wire 20 to emit light together with the light-emitting fiber 10.

The conductive layer 11 and the electrode wire 20 serve as electrodes respectively to supply power to the light-emitting material 13. Specifically, an alternating current may be applied to the conductive layer 11 and the electrode wire 20. When the voltage is high enough, electrons are injected into the light-emitting material 13 from the insulating semiconductor (dielectric layer 12 and light-emitting material 13) interface layer. The injected electrons obtain energy in a strong electric field. These high-energy electrons or hot electrons excite ions (such as $Cu^+$) acting as "light-emitting centers" through collision. The light-emitting centers in the excited state return to the ground state by emitting photons, and the electrons passing through the light-emitting material 13 are trapped in the insulating semiconductor interface layer on the other side. When the voltage of AC is reversed, the same process occurs again. Thus, the intersection Q of the conductive layer 11 and the electrode wire 20 can emit light under the action of an AC electric field. The brightness of intersection Q can be improved by increasing the voltage value and frequency of AC.

Specifically, the voltage value of AC ranges from 0.1V to 200V and the frequency ranges 50 Hz to 50 KHz. For example, the voltage value of AC can be 0.1V, 50V, 100V, 200V, etc. The frequency can be 50 Hz, 100 Hz, 10 KHz, 300 KHz, 50 KHz, etc.

Wherein, since a plurality of electrode wires 20 are respectively in contact with the light-emitting fibers 10 to form the intersections Q, and light emission can be realized only at the intersections Q. Therefore, by controlling the voltage applied to the light-emitting fibers 10 and the electrode wires 20, the light emission of different intersections Q can be controlled. That is, the lighting and luminescence of a specific pixel is realized by energizing the pixel, and then the required stereoscopic image is composed of stereoscopic pixels. At the same time, a resolution of the 3D display device 100 can be adjusted by an arrangement density of the light-emitting fibers 10 and the electrode wires 20.

Please continue to refer to FIG. 3, in the present embodiment, the light-emitting material 13 comprises a plurality of light-emitting particles doped in the insulating dielectric layer 12. Wherein, a doping concentration of the light-emitting material 13 ranges from 1 mg/mL to 1000 mg/mL. For example, the doping concentration of the light-emitting material 13 may be 1 mg/mL, 10 mg/mL, 100 mg/mL, 500 mg/mL, 800 mg/mL, 1000 mg/mL, etc., which will not be described here.

Since the particle size of the light-emitting particles is generally small, in the present embodiment, the light-emitting particles are directly doped in the insulating dielectric layer 12, which can further improve the transparency of the light-emitting fiber 10.

Figure 5:
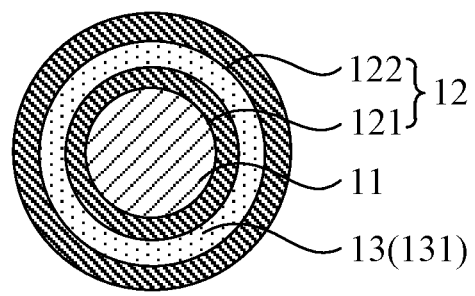
FIG. 5 is a schematic structural diagram of the second section along AA' of the light-emitting fiber shown in FIG. 2.

Referring to FIG. 2 and FIG. 5 at the same time, FIG. 5 is a schematic structural diagram of the second section along AA' of the light-emitting fiber shown in FIG. 2. The difference from the light-emitting fiber 10 shown in FIG. 3 is that, in the present embodiment, the light-emitting material 13 is a light-emitting layer 131. The insulating dielectric layer 12 comprises a first insulating dielectric layer 121 and a second insulating dielectric layer 122. The light emitting layer 131, the first dielectric layer 121 and the second dielectric layer 122 are coaxially arranged from inside to outside. The first insulating dielectric layer 121 is coated outside the conductive layer 11. The light-emitting layer 131 is coated outside the first insulating dielectric layer 121. And the second insulating dielectric layer 122 is coated outside the light-emitting layer 131.

In the present embodiment, the light-emitting layer 131 is arranged in the light-emitting fiber 10, so that the material selection range of the insulating dielectric layer 12 is greater, and the dispersion of the light-emitting particles does not need to be considered. In addition, the light-emitting layer 131 completely covers the first conductive layer 11 so that the light-emitting fiber 10 can be conductive everywhere, which can further improve the pixel density of the 3D display device 100.

In the present application, the number of light-emitting fibers 10 and electrode wires 20 can be designed according to the size and resolution of the 3D display device 100, which is not specifically limited in the present application.

In the present application, a plurality of light-emitting fibers 10 can extend in the same direction or in different directions, as long as any two light-emitting fibers in the 3D display device 100 do not intersect. Each of the electrode wires 20 can contact and intersect with one light-emitting fiber 10 or multiple light-emitting fibers which can be set according to the arrangement of the light-emitting fibers 10 and the electrode wires 20. In addition, the electrode wires 20 may intersect vertically with the light-emitting fibers 10 or only not vertically.

Specifically, please continue to refer to FIG. 1. In some embodiments of the present application, along a first direction Z, the 3D display device 100 comprises a plurality of display planes 101 parallel to each other. And in each display plane 101, a plurality of the light-emitting fibers 10 are arranged along a second direction X, a plurality of the electrode wires 20 are arranged along a third direction Y. The second direction X and the third direction Y intersect. And the second direction X and the third direction Y are perpendicular to the first direction Z.

In the present embodiment, the light-emitting fibers 10 and the electrode wires 20 are regularly arranged in the space along the first direction Z, the second direction X and the third direction Y, so as to obtain a regularly arranged pixel matrix. The regularly arranged pixels make the display brightness of the 3D display device 100 more uniform, so as to achieve a better display effect. In addition, since each pixel is evenly arranged, it is easier to control the light emission of the pixel by controlling the voltage applied to the corresponding light-emitting fiber 10 and electrode wiring 20, so as to avoid interference between each driving voltage signal. In addition, when the 3D display device 100 is a transparent display device, the regularly arranged light-emitting fibers 10 and electrode wires 20 can further improve the appearance aesthetics of the 3D display device 100.

Optionally, the second direction X is perpendicular to the third direction Y. That is, the light-emitting fibers 10 are arranged vertically across the electrode wire 20. This embodiment can further improve the arrangement regularity of the light-emitting fibers 10 and the electrode wires 20. In addition, since the light-emitting fibers 10 and the electrode wires 20 can be cross arranged by weaving. Therefore, arranging the light-emitting fibers 10 vertically across the electrode wires 20, can improve the stability between the light-emitting fibers 10 and the electrode wires 20 and avoid shaking between the light-emitting fibers 10 and the electrode wires 20.

In some embodiments of the present application, in each display plane 101, a plurality of the electrode wires 20 cover on the corresponding light-emitting fibers 10 to provide contact and intersection with the light-emitting fibers 10. The present embodiment can simplify the structure of the light-emitting fibers 10 and the electrode wires 20, and further simplify the process.

In other embodiments of the present application, in each display plane 101, a plurality of electrode wires 20 can be woven together with a plurality of corresponding light-emitting fibers 10 by weaving, so as to provide contact and intersection with the light-emitting fibers 20. The present embodiment can improve the structural stability of the light-emitting fibers 10 and the electrode wires 20, and avoid the problem of poor contact between the light-emitting fibers 10 and the electrode wires 20 during the movement of the 3D display device 100.

It can be understood that the 3D display device 100 provided in the present application is used to display a stereoscopic image. The stereoscopic image can be composed of the same color or different colors.

In this regard, in the present application, a plurality of light-emitting fibers 10 may display the same color. The brightness of different intersections Q can be controlled only by controlling the voltage value applied to the light-emitting fibers 10 and the electrode wires 20, so as to realize three-dimensional image display.

Of course, in the present application, the adjacent light-emitting fibers 10 may emit light with different colors. Which can make the image displayed by the 3D display device 100 more stereoscopic through the dual display effect of display color and display brightness.

Further, in the embodiment of the present application, the light-emitting fibers 10 comprise red light-emitting fibers, green light-emitting fibers and blue light-emitting fibers. In the same display plane 101, the red light-emitting fibers, the green light-emitting fibers and the blue light-emitting fibers are repeatedly arranged in any arrangement. In the adjacent display plane 101, the light-emitting fibers are arranged correspondingly to each other. Thus, the regularly arranged color pixel matrix is obtained, and the color stereo image display is realized.

Specifically, in the same display plane 101, the red light-emitting fibers, the green light-emitting fibers and the blue light-emitting fibers can be repeatedly arranged in any of the arrangement combinations of RGB, RBG, BGR, BRG, GRB, GBR, etc., which is not specifically limited in the present application.

Of course, the present application is not limited to this. The 3D display device 100 can also add white pixels on the basis of RGB pixel arrangement to form an RGBW pixel arrangement architecture. That is, white light-emitting fibers are added. With the addition of white light-emitting fibers, the light transmittance of the 3D display device 100 is significantly improved, and the brightness of the 3D display device 100 is also improved on the basis of the traditional RGB pixel arrangement architecture.

Please continue to refer to FIG. 1, in the present application, the 3D display device 100 also comprises a first substrate 31 and a second substrate 32 arranged opposite to each other and a third substrate 33 and a fourth substrate 34 arranged opposite to each other. And the first substrate 31, the second substrate 32, the third substrate 33, and the fourth substrate 34 are connected head to tail.

Wherein, one end of each of the light-emitting fibers 10 is fixed on the first substrate 31, another end of each of the light-emitting fibers 10 is fixed on the second substrate 32. One end of each of the electrode wires 20 is fixed on the third substrate 33, and another end of each of the electrode wires 20 is fixed on the fourth substrate 34.

Wherein, the first substrate 31, the second substrate 32, the third substrate 33 and the fourth substrate 34 may be made of transparent materials to view stereoscopic images from different angles outside the 3D display device 100. For example, the first substrate 31, the second substrate 32, the third substrate 33, and the fourth substrate 34 may be transparent glass substrates.

Wherein, the plane structures of the first substrate 31, the second substrate 32, the third substrate 33, and the fourth substrate 34 may be rectangular, square, arc, etc. Then, the three-dimensional structure formed by the head to tail connection of the first substrate 31, the second substrate 32, the third substrate 33, and the fourth substrate 34 may be a cube, a cuboid or a sphere. Thus, in a non-display state, the display device 100 has a shape of a cube, a cuboid, or a sphere, etc. And the appearance aesthetics of the 3D display device 100 is improved.

The light-emitting fibers 10 can be fixed between the first substrate 31 and the second substrate 32 by pasting, clamping and other means. The electrode wires 20 can also be fixed between the third substrate 33 and the fourth substrate 34 by pasting, clamping and other means.

In the present application, by arranging the first substrate 31, the second substrate 32, the third substrate 33, and the fourth substrate 34, the light-emitting fibers 10 and the electrode wires 20 can be stably fixed in the 3D display device 100, so as to avoid the problem of poor contact caused by shaking of the light-emitting fibers 10 and the electrode wires 20 during the movement of the 3D display device 100. Thus, the display stability of the 3D display device 100 is improved.

Further, in the present application, the 3D display device 100 further comprises a fifth substrate 35 and a sixth substrate 36 arranged opposite to each other. the first substrate 31, the second substrate 32, the third substrate 33, the fourth substrate 34, the fifth substrate 35, and the sixth substrate 36 form a closed structure. Wherein the fifth substrate 35 and the sixth substrate 36 are made of transparent material.

The present application is provided with a fifth substrate 35 and a sixth substrate 36, so that a closed structure is formed by using the first substrate 31, the second substrate 32, the third substrate 33, the fourth substrate 34, the fifth substrate 35, and the sixth substrate 36. As a shell of the 3D display device 100, the display structure in the 3D display device 100 can be protected. The stability of the 3D display device 100 is further improved.

Figure 6:
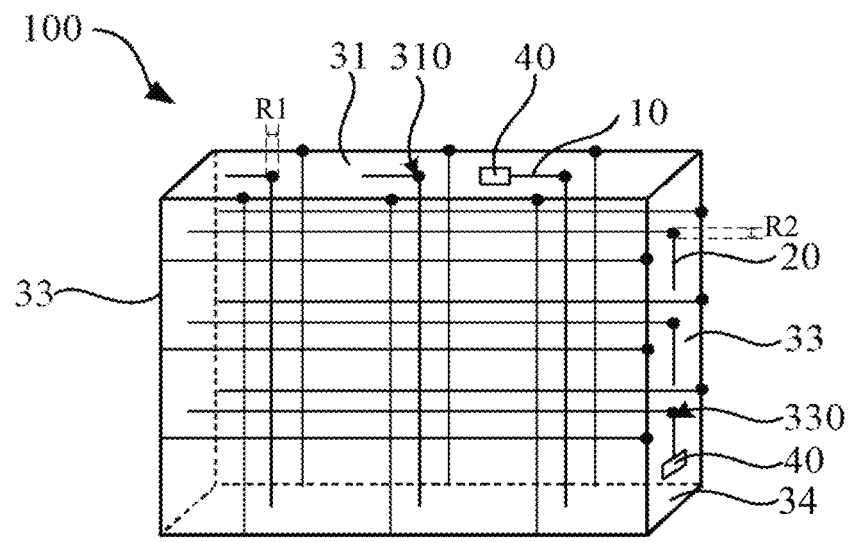
FIG. 6 is a second structural schematic diagram of the 3D display device provided by the present application.

Referring to FIG. 6, FIG. 6 is a second structural schematic diagram of the 3D display device provided by the present application. The difference from the 3D display device 100 shown in FIG. 1 is that, in the present embodiment, a first via 310 is arranged on the first substrate 31 and/or the second substrate 32. A second via 330 is arranged on the third substrate 33 and/or the fourth substrate 34. And each of the light-emitting fibers 10 extends outside the first substrate 31 or the second substrate 32 through the first via 310. And each of the electrode wires 20 extends outside the third substrate 33 or the fourth substrate 34 through the second via 330.

It can be understood that the present application needs to apply voltage to the light-emitting fibers 10 and the electrode wires 20 to make the corresponding intersection Q light, so as to achieve the effect of stereoscopic display. Therefore, it is necessary to lead out the ends of the light-emitting fibers 10 and the electrode wires 20 to facilitate the application of voltage.

Specifically, when the resolution of the 3D display device 100 is low, the distribution density of the light-emitting fibers 10 is small Therefore, the first vias 310 can be only provided on the first substrate 31 or the second substrate 32 to lead out the end of the light-emitting fibers 10 to the outside of the first substrate 31 or the second substrate 32. Similarly, the distribution density of electrode wires 20 is small. Therefore, the second vias 330 can be provided only on the third substrate 33 or the fourth substrate 34 to lead out the end of the light-emitting fibers 10 to the outside of the third substrate 33 or the fourth substrate 34. Thus, the extended light-emitting fibers 10 or electrode wires 20 are located only on one side of the 3D display device 100, improving the concentration of the circuit.

When the resolution of the 3D display device 100 is high, the distribution density of the light-emitting fibers 10 is high. Due to the limited size of the first substrate 31 or the second substrate 32, the present application arranges a plurality of first vias 310 on the first substrate 31 and the second substrate 32 respectively. On the one hand, a sufficient number of first vias 310 may be provided. In the second aspect, a cross short circuit is avoided when the adjacent light-emitting fibers 10 pass through the first vias 310. Similarly, the arranging of the second vias 330 is the same, and will not be repeated here.

Wherein, an aperture R1 of the first via 310 is adapted to a radial size of a cross section of the light-emitting fiber 10. While ensuring that the light-emitting fiber 10 smoothly passes through the first via 310, the light-emitting fiber 10 can be stably stuck in the first via 310. Similarly, an aperture R2 of the second via 330 is adapted to a radial size of a cross section of the electrode wire 20, which will not be repeated here.

Further, drive chips 40 may be arranged on the outside of the first substrate 31, the second substrate 32, the third substrate 33 and the fourth substrate 34. Each drive chip 40 is connected with the corresponding light-emitting fibers 10 or electrode wires 20 to provide a driving voltage to the light-emitting fibers 10 or electrode wires 20. It should be noted that FIG. 6 is only an example and does not draw all the first vias 310, the second vias 330, the light-emitting fibers 10 extending to the outside, and the electrode wires 20, but it can not be understood as a limitation of the present application.

Figure 7:
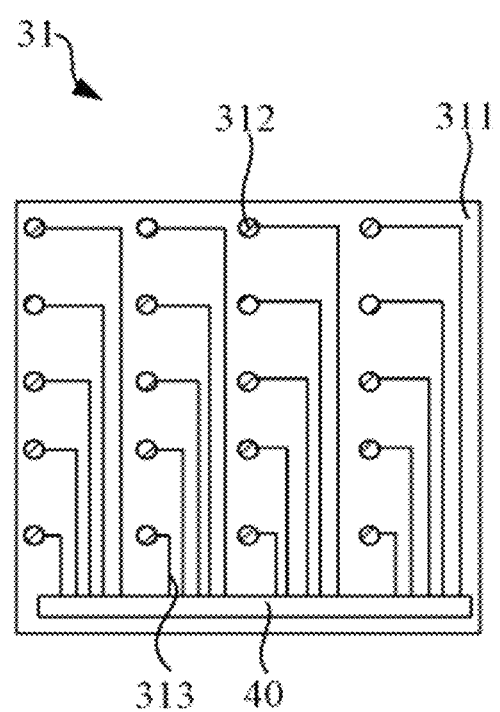
FIG. 7 is a structural schematic diagram of a first substrate in the 3D display device provided by the present application.

Optionally, referring to FIG. 7, FIG. 7 is a structural schematic diagram of a first substrate in the 3D display device provided by the present application. The difference from the 3D display device 100 shown in FIG. 6 is that, in the present embodiment, the first substrate 31 comprises a substrate 311, first conductive pins 312, and first connection lines 313. One end of each of the light-emitting fibers 10 is electrically connected with the corresponding first conductive pin 312. The light-emitting fiber 10 is connected to the first connection line 313 through the first conductive pin 312.

Further, the 3D display device 100 also comprises a drive chip 40. The driving chip 40 is connected with the light-emitting fibers 10 and the electrode wires respectively to provide a driving voltage to the light-emitting fibers 10 and the electrode wires 20.

The light-emitting fibers 10 and the electrode wires 20 can be connected to the same drive chip 40. The light-emitting fibers 10 can also be connected to different drive chips 40 with the electrode wires 20. The number of driving chips 40 can be set according to the number of light-emitting fibers 10 and electrode wires 20. The drive chip 40 may be arranged on the first substrate 31, the second substrate 32, the third substrate 33, or the fourth substrate 34, or at other positions of the 3D display device 100, which is not specifically limited in the present application.

Wherein, one end of each of the light-emitting fibers 10 can be electrically connected with the first conductive pin 312 through a conductive adhesive. The first conductive pin 312, the first connection line 313 and the drive chip 40 may be arranged on the inner wall or the outer wall of the first substrate 31. When the first conductive pin 312, the first connecting line 313 and the drive chip 40 are arranged on the outer wall of the first substrate 31, the first conductive pin 312 penetrates the first substrate 31 to realize the connection between the light-emitting fiber 10 and the first connection line 313.

In the present embodiment, by arranging the first conductive pins 312 on the first substrate 31, can avoid leading the light-emitting fibers 10 out of the outside of the first substrate 31. Thus, the light-emitting fibers 10 are better protected and the service life of the 3D display device 100 is improved.

Of course, the first conductive pins 312 and the first connection lines 313 may also be provided on the second substrate 32. For details, please refer to the structure of the first substrate 31 and will not be repeated here.

Figure 8:
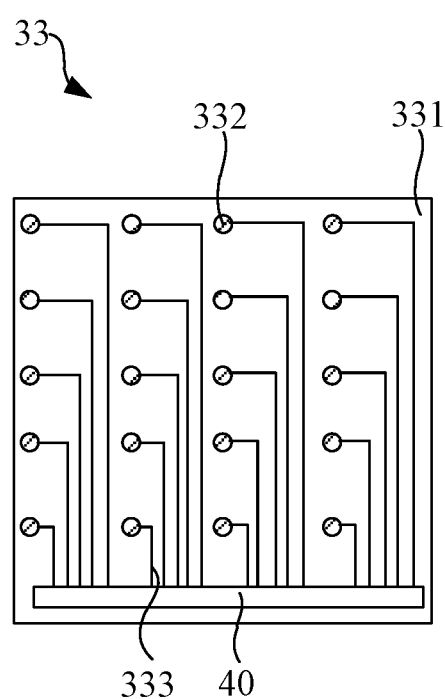
FIG. 8 is a structural schematic diagram of a third substrate in the 3D display device provided by the present application.

Similarly, referring to FIG. 8, FIG. 8 is a structural schematic diagram of a third substrate in the 3D display device provided by the present application. In this application, the third substrate 33 comprises a substrate 331, second conductive pins 332, and second connection lines 333. One end of each of the electrode wires 20 is electrically connected with the corresponding second conductive pin 332. The electrode wire 20 is connected to the second connection line 333 through the second conductive pin 332.

In the present embodiment, by arranging the second conductive pin 332 on the third substrate 33, can avoid leading the electrode wires 20 out of the outside of the third substrate 33. Thus, the electrode wires 20 are better protected and the service life of the 3D display device 100 is improved.

Of course, the second conductive pins 332 and the second connection lines 333 may also be provided on the fourth substrate 34. For details, please refer to the structure of the third substrate 33, which will not be described here.

The 3D display device provided by the present application are described in detail above. Specific examples are used in this application to explain the principles and implementations of the application. The description of the above embodiments is only used to help understand the method and core ideas of the application. At the same time, for those of ordinary skill in the art, according to the ideas of this application, there will be changes in the specific implementation and scope of application. In summary, the content of this specification should not be construed as a reference limits.

What is claimed is:

1. A 3D display device, comprising: a plurality of light-emitting fibers arranged at intervals and arranged in different planes; and a plurality of electrode wires arranged at intervals and arranged across and in contact with the corresponding light-emitting fibers to form a 3D network structure;

wherein along a first direction, the 3D display device comprises a plurality of display planes parallel to each other; in each display plane, a plurality of the light-emitting fibers are arranged along a second direction, a plurality of the electrode wires are arranged along a third direction, the second direction and the third direction intersect, and the second direction and the third direction are perpendicular to the first direction;

wherein the 3D display device also comprises a first substrate and a second substrate arranged opposite to each other and a third substrate and a fourth substrate arranged opposite to each other, and the first substrate, the second substrate, the third substrate, and the fourth substrate are connected end to end; and wherein one end of each of the light-emitting fibers is fixed on the first substrate, another end of each of the light-emitting fibers is fixed on the second substrate, one end of each of the electrode wires is fixed on the third substrate, and another end of each of the electrode wires is fixed on the fourth substrate;

wherein a first via is arranged on the first substrate and/or the second substrate, a second via is arranged on the third substrate and/or the fourth substrate, and each of the light-emitting fibers extends outside the first substrate or the second substrate through the first via, and each of the electrode wires extends outside the third substrate or the fourth substrate through the second via.

2. The 3D display device of claim 1, wherein the light-emitting fibers are arranged vertically across the electrode wire.

3. The 3D display device of claim 1, wherein the adjacent light-emitting fibers emit light with different colors.

4. The 3D display device of claim 1, wherein the light-emitting fibers comprise red light-emitting fibers, green light-emitting fibers, and blue light-emitting fibers; and
wherein in the same display plane, the red light-emitting fibers, the green light-emitting fibers, and the blue light-emitting fibers are repeatedly arranged in any arrangement, and in the adjacent display planes, the light-emitting fibers are arranged correspondingly to each other.

5. The 3D display device of claim 1, wherein the light-emitting fibers comprise white light-emitting fibers, red light-emitting fibers, green light-emitting fibers, and blue light-emitting fibers; and
wherein in the same display plane, the white light-emitting fibers, the red light-emitting fibers, the green light-emitting fibers, and the blue light-emitting fibers are repeatedly arranged in any arrangement, and in the adjacent display planes, the light-emitting fibers are arranged correspondingly to each other.

6. The 3D display device of claim 1, wherein a resolution of the 3D display device is adjusted by an arrangement density of the light-emitting fibers and the electrode wires.

7. The 3D display device of claim 1, wherein a plurality of the electrode wires overlap cover on the corresponding light-emitting fibers to provide contact and intersection with the light-emitting fibers.

8. The 3D display device of claim 1, wherein in a non-display state, the display device has a shape of a cube, a cuboid, or a sphere.

9. The 3D display device of claim 1, wherein an aperture of the first via is adapted to a radial size of a cross section of the light-emitting fiber, and an aperture of the second via is adapted to a radial size of a cross section of the electrode wire.

10. The 3D display device of claim 1, wherein the first substrate and/or the second substrate comprises first conductive pins, the third substrate and/or the fourth substrate comprises second conductive pins, one end of each of the light-emitting fibers is electrically connected with the corresponding first conductive pin, and one end of each of the electrode wires is electrically connected with the corresponding second conductive pin.

11. The 3D display device of claim 10, wherein the 3D display device further comprises a driving chip, the driving chip is connected with the light-emitting fibers through the first conductive pins, the driving chip is connected with the electrode wires through the second conductive pins, and the driving chip is configured to provide driving voltage to the light-emitting fibers and the electrode wires.

12. The 3D display device of claim 1, wherein the 3D display device further comprises a fifth substrate and a sixth substrate arranged opposite to each other, the first substrate, the second substrate, the third substrate, the fourth substrate, the fifth substrate, and the sixth substrate form a closed structure; and
wherein the fifth substrate and the sixth substrate are made of transparent material.

13. The 3D display device of claim 1, wherein the light-emitting fiber comprises a conductive layer and an insulating dielectric layer coaxially arranged from inside to outside, and a light-emitting material is arranged in the insulating dielectric layer; and
wherein the conductive layer and the electrode wires are made of transparent material and/or stretchable material.

14. The 3D display device of claim 13, wherein a thickness of the dielectric layer ranges from 5 μm to 500 μm.

15. The 3D display device of claim 13, wherein the light-emitting material comprises a plurality of light-emitting particles doped in the insulating dielectric layer.

16. The 3D display device of claim 15, wherein a particle size of the light-emitting material ranges from 50 nm to 10 μm; and
wherein a doping concentration of the light-emitting material ranges from 1 mg/mL to 1000 mg/mL.

17. The 3D display device of claim 13, wherein the light-emitting material comprises a light-emitting layer, the insulating dielectric layer comprises a first insulating dielectric layer and a second insulating dielectric layer, the first insulating dielectric layer is coated outside the conductive layer, the light-emitting layer is coated outside the first insulating dielectric layer, and the second insulating dielectric layer is coated outside the light-emitting layer.

* * * * *